United States Patent [19]

Koretz

[11] Patent Number: 5,136,527

[45] Date of Patent: Aug. 4, 1992

[54] SURFACE FINISH MEASURING DEVICE AND METHOD FOR GEAR TEETH

[75] Inventor: Donald B. Koretz, Ann Arbor, Mich.

[73] Assignee: Precision Devices, Inc., Milan, Mich.

[21] Appl. No.: 593,086

[22] Filed: Oct. 5, 1990

[51] Int. Cl.$^5$ ................................................ G01B 5/20
[52] U.S. Cl. .................................. 364/571.01; 33/504;
33/556; 364/560
[58] Field of Search .......................... 33/561, 556, 504;
73/105; 364/474.35, 474.37, 560, 571.01

[56] References Cited

U.S. PATENT DOCUMENTS

| | | | |
|---|---|---|---|
| 3,573,444 | 4/1971 | Kawabata | 73/105 X |
| 3,903,735 | 9/1975 | Wilson | 73/105 |
| 4,167,066 | 9/1979 | Cooper et al. | 33/504 |
| 4,377,911 | 3/1983 | Iida et al. | 33/558.04 X |
| 4,574,625 | 3/1986 | Olasz et al. | 73/866.1 X |

Primary Examiner—Parshotam S. Lall
Assistant Examiner—Edward R. Cosimano
Attorney, Agent, or Firm—Harness, Dickey & Pierce

[57] ABSTRACT

A surface finish measuring device for gear teeth. The device includes a probe for tracing an involute surface such of a gear tooth, a computer numerical control (CNC) machine for receiving perimeters relating to the geometry of the structure being measured and rotating the structure at a preferably constant angular velocity; and a computer for determining which measured points on the involute surface are to be used by a display device such as a strip chart recorder to graphically illustrate, in a highly magnified fashion, the topography of the involute surface being measured. The present invention overcomes the problems associated with the rate at which the distance between consecutive measurements changes when measuring an involute surface to provide a collection of relatively evenly spaced measurement points. The relatively evenly spaced measurement points help to provide a more accurate graphical display of the topography of an involute surface when plotted out on a graphics plotter or other display device.

13 Claims, 2 Drawing Sheets

SURFACE FINISH MEASURING DEVICE AND METHOD FOR GEAR TEETH

BACKGROUND OF THE INVENTION

1. Technical Field

This invention relates to measurement systems for measuring the topology of surfaces of variously shaped work pieces, and more particularly to a surface finish measuring device for measuring the topography of involute surfaces such as gear teeth.

2. Discussion

Surface measuring devices are used in a wide variety of applications to measure the topologies of the surfaces of variously shaped work pieces. Such measurement systems have utility in performing topological analysis of gears and gear teeth having involute-curved surfaces. Topological analysis of gear teeth surfaces is important in determining the cause of and alleviating gear noise, vibration, etc.

One drawback that has existed with heretofore available measurement systems is the inability of such systems to provide uniformly spaced measurement points when measuring involute gear teeth surfaces. With involute surfaces, the velocity at which a probe or other measuring device traces the surface will vary as the probe moves from the edge of the root to the outermost edge of a gear tooth while the gear is being rotated at a constant angular velocity. As a result of this change in velocity of the probe, measurement samples which the probe obtains at uniform, fixed time intervals over various points on the involute surface of the tooth will vary in spacing. Put differently, the distance between consecutively measured points on the involute surface will vary rather than remain constant as the probe traces the involute surface.

The above described change in distance between the points measured by the probe causes a strip chart recorder, plotter or other like graphic display instrument displaying a graphical representation of the measured points to generate a non-uniform graphical representation of the involute surface. This non-uniform graphical display hinders the efficacy of graphical displays in providing accurate graphical representations of the topographies of involute surfaces.

SUMMARY OF THE INVENTION

Accordingly, it is a principal object of the present invention to provide a surface finish measuring device and method operable to measure the topography of an involute surface.

It is further an object of the present invention to provide a surface finish measuring device for measuring involute surfaces which operates to select, from a large plurality of independent measurements taken along an involute curve, a group of measurements, where the group represents measurements taken at evenly spaced intervals over the involute surface.

It is further an object of the present invention to provide a surface finish measuring device operable to disregard measurements taken at specific points along an involute surface.

It is still further an object of the present invention to provide a surface finish measuring device for obtaining measurements, where the measurements are obtained at evenly spaced apart points on an involute curve of a workpiece, and where the measurements may be output to a graphic display device such as a plotter for visual analysis of the topography of the involute surface.

It is still a further object of the present invention to provide a surface finish measuring device which may be used in connection with involute surfaces appearing on a wide variety of work pieces such as gear teeth, camshaft lobes, bores of work pieces having involute surfaces, etc.

The above and other objects of this invention are provided by a surface finish measuring device and method for measuring involute surfaces. In a preferred embodiment, the invention comprises a probe-like measuring instrument for tracing an involute surface of a workpiece and generating a plurality of independent signals representative of the topography of the involute surface at particular points along the surface, a numerical controlled machine for moving the probe-like measuring instrument so as to maintain the instrument normal to the surface being measured, and a processor for determining which measurements from those generated by the probe-like device are to be used in generating a graphical output of the topography of the involute surface. The measurement signals selected by the processor represent measurements taken at points along the involute surface where the points are separated by relatively equal distances.

When the points obtained by the processor are output to a graphical display device such as a strip chart recorder, graphics plotter, printer, etc., the uniform spacing between the points at which the selected measurements have been measured enables the display device to generate a more true and accurate graphical representation of the topography of the involute surface.

In a preferred embodiment of the invention the probe-like measuring device comprises a measuring probe incorporating a linear, variable, differential transducer (LVDT). The LVDT operates as a precision measurement device to provide voltage signals which represent the topography of the surface being measured as the measuring probe traces it during the measurement process.

BRIEF DESCRIPTION OF THE DRAWINGS

The various advantages of the present invention will become apparent to one skilled in the art by reading the following specification and subjoined claims and by referencing the following drawings, in which:

FIG. 5 is a graphical illustration of a curve representative of a gear tooth, the points along the gear tooth at which measurements are taken as represented by slashes, and the points at which measurements are actually kept, as represented by X's marked over the slashes.

DETAILED DESCRIPTION OF THE PREFERRED EMBODIMENTS

Figure 1:
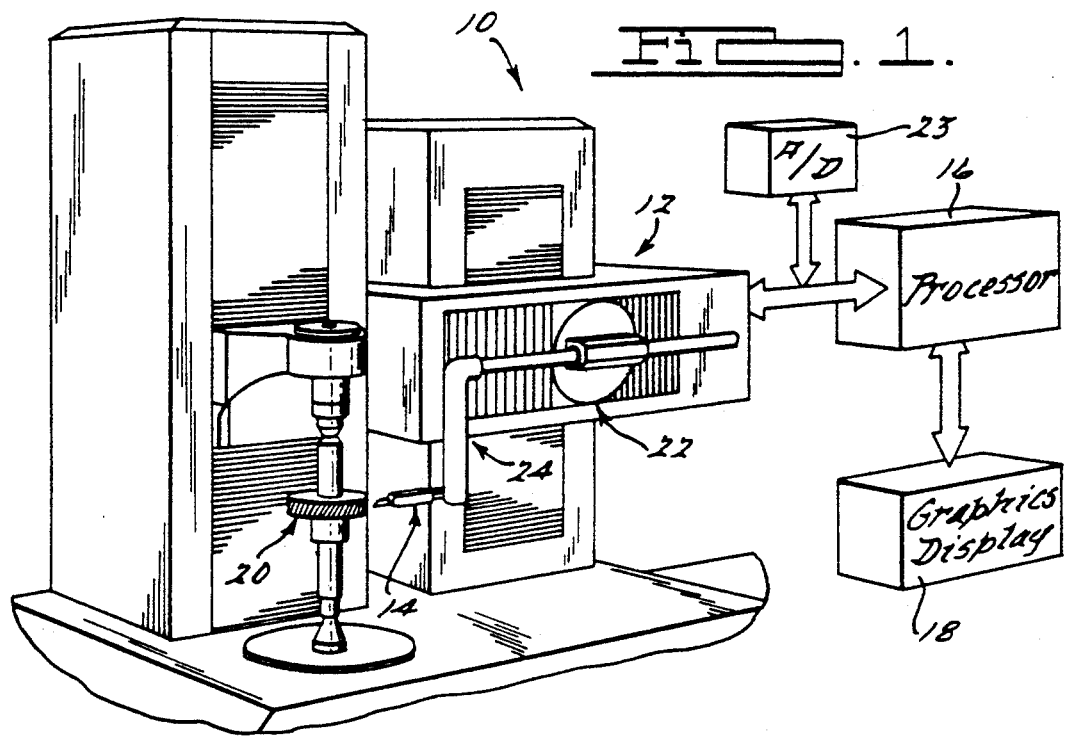
FIG. 1 is a simplified illustration of a complete system in accordance with the present invention.

Referring now to FIG. 1, there is shown a surface finish measuring device and method 10 for gear teeth.

The system 10 generally comprises a computer numerical control (CNC) machine tool apparatus 12; a position sensitive probe 14; a processor 16 electrically interfaced with the CNC machine 12; and a graphics display device 18. Also shown in FIG. 1 is a helical gear 20 which ma be measured by the system 10. An analog-to-digital (A/D) converter 23 is also included for converting analog measurement signals output by probe 14 into digital form to be read by processor 16. It should be appreciated, that the A/D converter 23 could readily be incorporated into processor 16 or alternatively into CNC machine 12 if so desired.

To help facilitate the measurement process the CNC machine 12 incorporates a mounting assembly 22 for positioning and rotating the gear 20 concentrically about a known axis. The CNC machine 12 further includes a probe mounting arm 24 for maintaining the probe in a position preferably normal to the surface of the gear 20 with which it is in contact at any given instant.

For the processor 16, a presently preferred embodiment of the invention incorporates a relatively powerful 80386/25 MHz IBM compatible series computer incorporating preferably at least about 1 megabyte of on-board random access memory (RAM). It should be appreciated, however, that a wide variety of commercially available computers could be readily incorporated into the present invention in lieu of the presently preferred IBM compatible computer.

In the presently preferred embodiment the graphical display device 18 is a plotter and video graphics monitor, although it will be appreciated that other graphical display devices such as printers, X-Y strip chart recorders, etc., could be readily incorporated into the system 10 to suit specific needs and/or applications.

It should also be mentioned that while a helical gear has been illustrated in FIG. 1, the present invention is not restricted to measuring this particular type of gear, or even gears in general, but rather will measure a wide variety of types of gears and other workpieces such as camshaft lobes. This will become more apparent momentarily in connection with FIG. 3, wherein a spur gear has been illustrated to more clearly show the manner in which the probe 14 traverses a particular tooth of a gear. Furthermore, the invention is not restricted to measuring involute surfaces. Even workpieces having flat surfaces which are to be rotated about a central axis may be accurately measured by the present invention.

Figure 2:
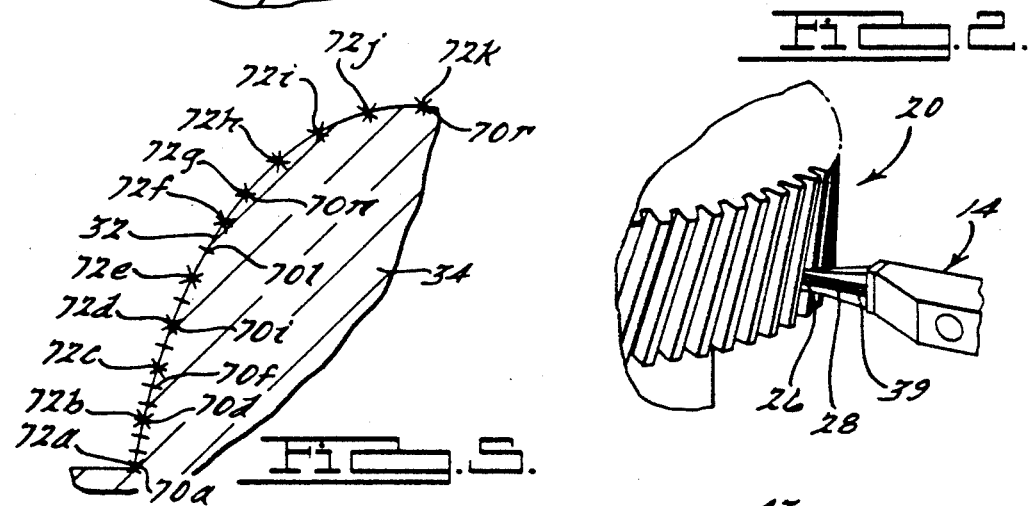
FIG. 2 is an enlarged, fragmentary view of a portion of the gear shown in FIG. 1 together with the probe, showing more clearly the probe in contact with a gear tooth surface.

Referring now to FIG. 2, an enlarged, fragmentary view of a portion of gear 20 is illustrated along with a portion of the probe 14. From FIG. 2 it can be seen more clearly that the probe 14 incorporates a stylus 26 secured to an external stylus beam 28 preferably by bonding or another like method of attachment. The external stylus beam 28 is in turn fixedly secured to a pivoting internal beam 39, which helps enable movement of the external stylus beam 28 to maintain stylus 26 in a position normal to the surface of a particular tooth of the gear 20.

Figure 3:
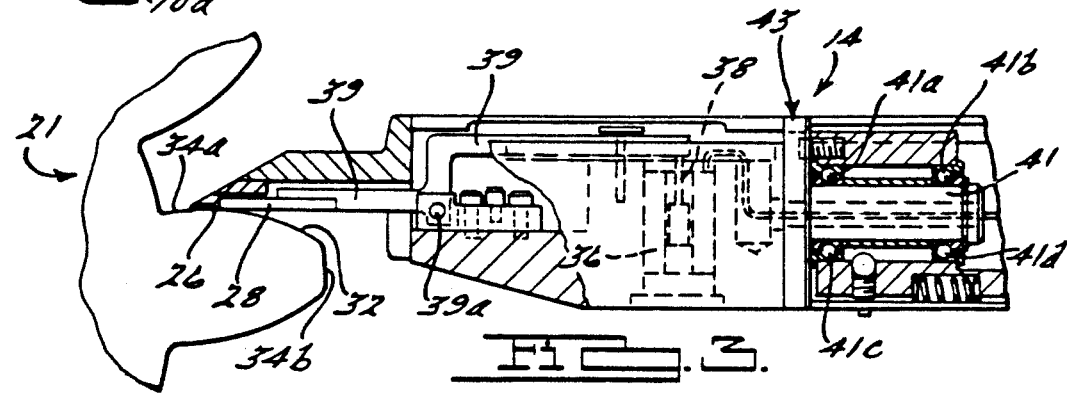
FIG. 3 is a simplified cross-sectional view of a portion of the probe showing the linear variable differential transducer (LVDT) disposed therein.

In FIG. 3, a fragmentary, cross-sectional view of a portion of probe 14 is shown with stylus 26 in contact with an involute portion 32 of a tooth 34 of a spur gear 21. A spur gear 21 has been illustrated in FIG. 3 to more easily illustrate the contact which stylus 26 makes normal to the involute portion 32 of the tooth 34. Gear tooth 34 has root portion 34a and outermost edge portion 34b, which will be discussed further in the following paragraphs. For further helping to maintain stylus 26 normal to gear tooth 34, probe 14 includes a longitudinally mounted pivot shaft shaft 41 and a plurality of bearings 41a, 41b, 41c and 41d for enabling pivot shaft 41 to rotate axially in a smooth and free manner. Pivot shaft 41 is coupled to an axially rotatable front portion 43 of probe 14, thereby enabling stylus 26, external stylus beam 28 and pivoting internal beam 39 to rotate axially relative to the longitudinal axis of probe 14. Also shown in FIG. 3 is a pivot bearing 39a for enabling stylus arm 28, stylus 26 and internal beam 39 to move pivotally towards and away from gear tooth surface 32 of gear tooth 34.

The probe 14 incorporates a highly position sensitive measuring device, which in a preferred embodiment of the invention represents a linear variable differential transducer (LVDT). The LVDT 36 includes a needle-like position responsive element 38 which is coupled to the stylus beam 28 via pivoting internal beam 39.

In operation, specific control data relating to the geometry of gear 21 is input into CNC machine 12 to enable machine 12 to maintain stylus 26 in a position normal to involute surface 32. The speed at which gear 21 is to be rotated during the measurement process is also input to machine 12. As the stylus 26 moves over involute surface 32 of gear tooth 34, beam 39 moves pivotally about the pivot bearing 39a, thereby causing element 38 to move inwardly or outwardly relative to the LVDT 36. This causes the LVDT 36 to generate a voltage representative of the amount of movement of element 38. The amount of movement of element 38 is representative of the distance normal to surface 32 stylus 26 moves as it traces the topology of involute surface 32. Accordingly, by moving the stylus 26 across the involute surfaces of each gear tooth, the topography of the involute surfaces may be determined in accordance with the changing voltage levels output by the LVDT 36. It should be appreciated that the foregoing has been intended only as a simplified overview of the basic working of a gear tooth measuring probe and associated LVDT. A detailed explanation of the internal workings of a linear variable differential transducer (LVDT) may be obtained from suitable electromechanical texts.

Figure 4:
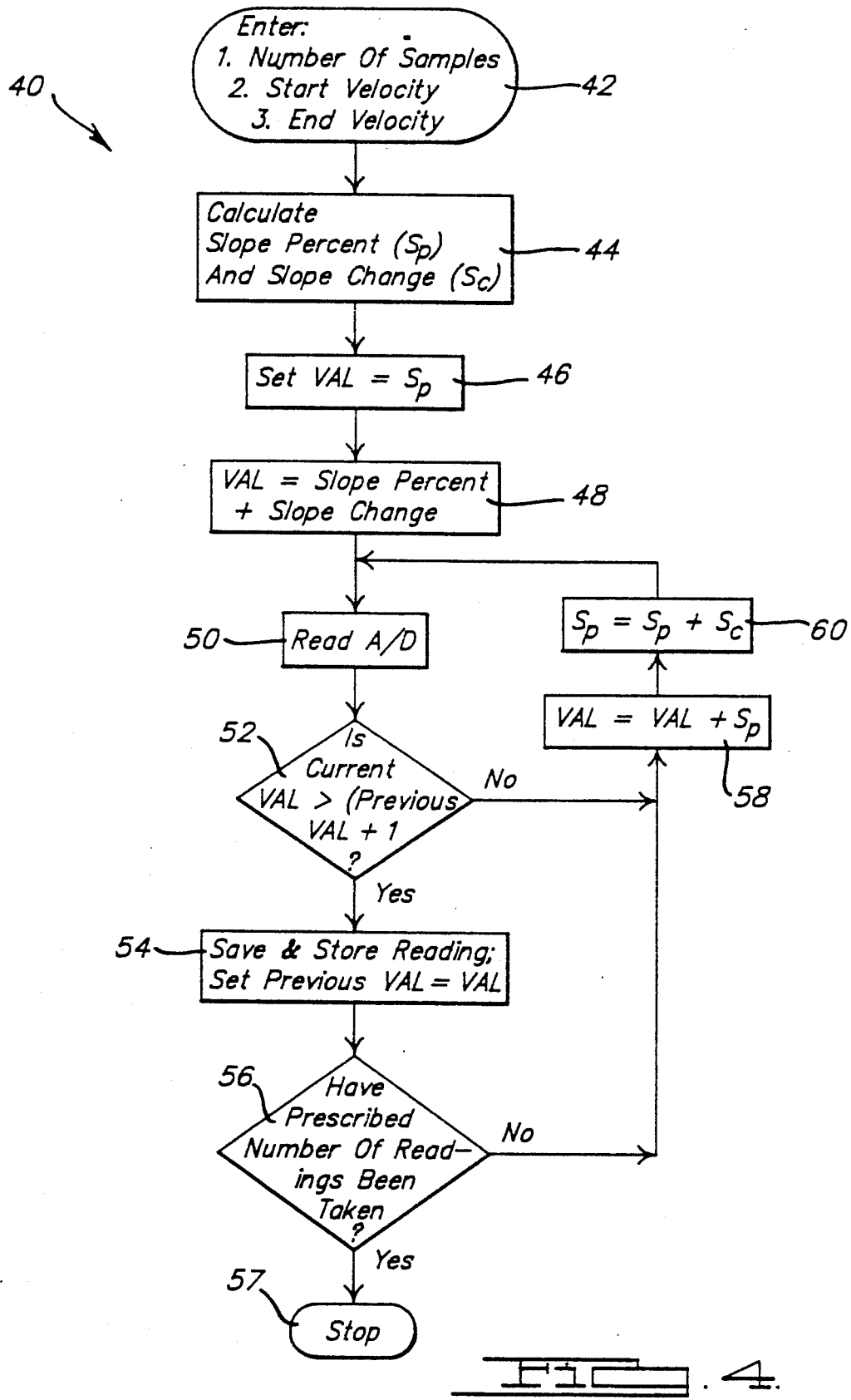
FIG. 4 is a flowchart in accordance with the operation of the present invention.

Referring now to FIGS. 3, 4 and 5, a detailed description of the operation of the invention will be provided. Referring first to FIG. 4, a flowchart 40 illustrating the sequence of operation of the system 10 is shown. The processor 16 is initially loaded with the number of desired topological measurement samples sought to be plotted on graphic display device 18; the known, initial starting velocity of the probe 14 when the probe 14 is traversing the end of root area 34a of the gear tooth 34; and the ending velocity of the probe 14 when the probe is traversing the outermost edge portion 34b of the gear tooth 34, as indicated at 42. It should be appreciated that since the gear 21 will be rotated preferably at a known, relatively constant angular velocity, the probe's 14 angular velocity will increase as it moves from the end of root portion 34a to the outermost edge portion 34b of gear tooth 34. This is because the angular velocity of any given point on the gear tooth 21 will increase or decrease as the distance between the point and the axis of rotation of the gear increases. Accordingly, the probe 14 experiences different surface velocities as it moves from the root portion 34a to the outermost edge portion 34b of each tooth of gear 21.

The system 10, based on the above described information, the geometry of the gear being measured, and the angular velocity of the gear 21, determines the rate at which the distance between two successively measured (i.e., adjacent) points changes. This rate of change in distance between successively measured points along surface 32 is denoted as a "slope" percent value ($S_p$), as shown at 44.

The system 10, from the above described information, also calculates the rate at which the slope percent value ($S_p$) will change per measurement sample desired to be kept and displayed on display device 18. This rate at which the slope percent value changes per sample desired to be kept is denoted as a "slope change" ($S_c$) variable, also indicated at 44. The actual formula by which slope change ($S_c$) is calculated is expressed by the following formula:

(1−(start velocity at root/end velocity at outermost edge))/ samples needed

The actual formula by which slope percent ($S_p$) is determined is as follows:

((start velocity at root/end velocity at outermost edge)+slope change)/2

The system 10 next sets a variable (VAL) equal to the initial slope percent ($S_p$) value, as indicated at 46. Slope percent ($S_p$) is then set to a value equal to the sum of the initial value for slop percent ($S_p$) and the initial value for slope change ($S_c$), as indicated at 48.

The system 10 next enters a loop whereby the analog-to-digital (A/d) converter 23 is read to determine the displacement of the LVDT 36 of probe 14, as indicated at 50. The system 01 then determines if the current VAL is greater than the sum of the previous VAL+1, as indicated at 52. If not, then VAL is set equal to the sum of the current VAL value and the current slope percent ($S_p$) value, as indicated at 58. If so, the system 10 saves the measurement reading and stores the information in the memory of computer 61, as indicated at 54. The previous VAL is then set equal to the current VAL, as also indicated at 54.

Next, the system checks to determine if the prescribed number of readings have been obtained, as indicated at 56. If so, the system 10 ceases taking measurement readings, as indicated at 57. If not, then the step indicated at 58, described above, is performed. The slope percent ($S_p$) value is then set equal to the current slope percent ($S_p$) value plus the current slope change ($S_c$) value, as indicated at 60. The system 10 then proceeds to again read the A/D converter 23 to determine if the next measurement reading should be saved. The cycle repeats continuously until the desired number of samples has been obtained.

The result of the operation described above can be seen most clearly in FIG. 5, wherein a highly enlarged portion of gear tooth 34 is shown, together with the points at which measurements are taken along its perimeter, as indicated by slash marks 70a-70r. It should be appreciated immediately that while only a small plurality of points 70a-70r have been illustrated along surface 32, in actual operation of the system 10 measurements are taken along surface 32 at time intervals of preferably about 0.83 milliseconds, or approximately at a frequency of about 1250 Hz. Accordingly, in actual operation, hundreds of measurements may be taken along gear tooth 34.

FIG. 5 also illustrates, via X's 72a-72k, which measurement readings 70a-70r taken along involute surface 32 of gear tooth 34 will be saved to be eventually plotted by display device 18. It will be noted that the distance between adjacent slash marks 70a-70r is significantly less at the root portion 34a of gear tooth 34 than at the outermost edge portion 34b. If these measurement readings 70a-70r were all plotted out directly on a graphics display device such as plotter 18, they would provide a misleading indication of the overall topography of gear tooth 34, since the majority of measurement readings 70a-70r are concentrated towards the root portion 34a of gear tooth 34. Accordingly, some external means for compensating for this irregularity would normally otherwise have to be included in display device 18 or CNC machine 12.

With the system 10 of the present invention, only the measurement readings marked by X's 72a-72k are actually kept in memory of computer 16 to be plotted on plotter 18. Since measurement readings 72a-72k are spaced apart by much more even and uniform distances, when measurement readings 72a-72k are plotted on plotter 18, the resulting graph represents a true and accurate illustration of the topographical characteristics of the teeth of a particular gear. Accordingly, the system 10 operates to take a plurality of measurements and selectively keep a pre-specified number which are each spaced apart by relatively even distances.

Those skilled in the art can now appreciate from the foregoing description that the broad teachings of the present invention can be implemented in a variety of forms. Therefore, while this invention has been described in connection with particular examples thereof, the true scope of the invention should not be s limited since other modifications will become apparent to the skilled practitioner upon a study of the drawings, specification and following claims.

What is claimed is:

1. A method for graphically representing the topography of involute surfaces, comprising:
providing a structure having at least one involute surface;
defining the geometry of said structure having said involute surface;
providing probe means for tracing the topology of said involute surface and providing a first plurality of topography-indicating signals;
defining a number of said topography-indicating signals to be used as samples in representing said topography of said involute surface;
defining a starting velocity at which said probe means traces a first location on said involute surface;
defining a second velocity at which said probe means traces a second location on said involute surface;
using said geometry of said structure, said starting velocity and said second velocity to determine a rate ($S_p$) at which a distance between successive topography-indicating signals representing said involute surface changes;
determining a rate ($S_c$) at which said distance between successive topography-indicating signals changes per said sample;
causing said probe means to traverse said involute surface to thereby generate said first plurality of topography-indicating signals;
controllably selecting from said first plurality of topography-indicating signals a second plurality of signals in accordance with said number of topography indicating signals to be used as samples, wherein said signals of said second plurality of signals are representative of evenly spaced apart points along said involute surface; and using said signals of said second plurality of signals to graphically represent said topography of said involute surface.

2. The method of claim 1, further comprising:
generating an output on a display device responsive to said second plurality of signals to thereby enable graphical representation of said involute surface of said structure.

3. The method of claim 1, wherein obtaining said first plurality of topography-indicating signals comprises reading an analog-ti-digital (A/D) converter a plurality of times.

4. The method of claim 1, wherein obtaining said second plurality of topography-indicating signals comprises:
setting a variable equal to said rate ($S_p$) at which said distance between successive topography-indicating signals changes along said involute surface;
setting said rate ($S_p$) at which said distance between said topography-indicating points changes equal to the sum of said rate ($S_p$) at which said distance between said topography-indicating signals changes and said rate ($S_c$) said distance changes per said sample;
reading an analog-to-digital (A/D) converter to obtain a topography-indicating signal;
determining if said variable (VAL) currently has a value less than the sum of a previously measured rate ($S_p$) at which said distance between said topography-indicating signals changes and said rate ($S_c$) said distance changes per said sample;
saving and storing said current VAL when said current VAL is greater than the sum of the previously determined VAL plus 1, and setting VAL equal to said previously determined VAL;
determining if said number of said topography-indicating signals to be used as samples has been obtained;
setting said variable (VAL) equal to the sum of a current variable (VAL) plus the current rate ($S_p$) at which said distance between said topography-indicating signals changes; and
setting said rate ($S_p$) equal to the sum of the current rate ($S_p$) t which said distance between said topography-indicating signals changes and said rate ($S_c$) said distance changes per said sample.

5. A method for more accurately graphically representing the topography of involute surfaces, comprising:
providing a structure having at least one involute surface;
providing probe means having a stylus for tracing the topology of said involute surface and providing a first plurality of topography-indicating signals;
providing a computer numerical controlled (CNC) machine for controlling said probe means;
defining the geometry of said structure having said involute surface;
inputting said geometry of said structure into said CNC machine to thereby enable said CNC machine to maintain a stylus of said probe means normal to said involute surface while said surface is being analyzed;
defining a number of said topography-indicating signals to be used as samples in representing said involute surface;
defining a first location on said involute surface;
defining a second location on said involute surface;
defining a starting velocity at which said probe means traverses over said said first location on said involute surface;
defining a second velocity at which said probe means traverses over said second location on said involute surface;
using said first and second velocities to determine a rate ($S_p$) at which a distance between successive topography-indicating signals representing said involute surface changes;
determining a rate ($S_c$) at which said distance between successive topography-indicating signals changes per said sample;
causing said probe means to traverse said involute surface from said first to said second locations to thereby generate said first plurality of topography-indicating signals;
setting a variable (VAL) equal to said rate ($S_p$) at which said distance between successive topography-indicating signals changes along said involute surface;
setting said ($S_p$) rate at which said distance between said topography-indicating points changes equal to the sum of said rate ($S_p$) at which said distance between said topography-indicating signals changes and said rate ($S_c$) said distance changes per said sample;
reading an analog-to-digital (A/D) converter to obtain a topography-indicating signal;
determining if a current value of VAL is less than the sum of a previously measured rate ($S_p$) at which said distance between said topography-indicating signals changes and said rate ($S_c$) said distance changes per said sample;
saving and storing said current value of said VAL when said current VAL is greater than the sum of the previously determined VAL plus 1, and setting said current VAL equal to said previously determined VAL;
determining if said number of said topography-indicating signals to be used as samples has been obtained;
setting said VAL equal to the sum of said current VAL plus a current rate ($S_p$) at which said distance between said topography-indicating signals changes; and
setting said rate ($S_p$) equal to the sum of the current rate ($S_p$) at which said distance between said topography-indicating signals changes and said rate ($S_c$) said distance changes per said sample.

6. An apparatus for measuring the topography of a surface of a workpiece, comprising:
probe means for tracing the topography of at least a portion of said surface of a workpiece and proving a first plurality of topography-indicating signals;
machine tool means for controllably moving said workpiece to be inspected by said apparatus and for maintaining said end portion of said probe means substantially at a predetermined orientation with respect to said surface of said workpiece to be measured; and
processing means responsive to said probe means for receiving said first plurality of topography-indicating signals, determining a rate at which a distance between successive signals of said first plurality of signals changes, and controllably selecting therefrom a second plurality of topography-indicating signals, said second plurality of topography-indicating signals being representative of evenly spaced apart locations along said surface of said workpiece being measured, said second plurality of topography-indicating signals thereby being operable to provide a uniform and accurate representation of said topography of said workpiece when said second plurality of topography-indicating signals are output to a display device.

7. The apparatus of claim 6, wherein said probe means comprises:
   a stylus adapted to trace over said topography of said workpiece being measured;
   a stylus arm for mounting said stylus thereon and helping maintain said stylus normal to said surface of said workpiece being measured;
   a pivotal internal connection arm responsive to movement of said stylus; and
   a linear variable differential transducer responsive to said pivoting stylus arm for generating said first plurality of topography-indicating signals in response to pivotal movement of said stylus arm.

8. The apparatus of claim 6, wherein said computer performs the steps comprising:
   receiving from an operator of said apparatus the desired number of samples to be incorporated for generating said graphical display of said topography of said workpiece;
   receiving from an operator of said apparatus a starting velocity of said probe means at a first location on said workpiece;
   receiving from an operator of said apparatus an ending velocity of said probe means at a second location on said workpiece;
   determining a rate ($S_p$) at which a distance between successively obtained signals of said first plurality of topography-indicating signals changes;
   determining a rate ($S_c$) at which said distance between successively obtained signals of said first plurality of topography-indicating signals changes per said sample; and
   generating an output to a display device from said second plurality of topography-indicating signals to thereby enable topographical analysis of said involute surface of said structure.

9. The apparatus of claim 6, further comprising graphical display means responsive to said processor means for generating a graphical display of said topography of said workpiece in accordance with said second plurality of topography-indicating signals.

10. The apparatus of claim 9, wherein said graphical display means comprises a graphics plotter.

11. The apparatus of claim 9, wherein said graphical display means comprises a graphics video terminal.

12. The apparatus of claim 9, wherein said graphical display means comprises an X-Y strip chart recorder.

13. A method for graphically representing the topography of involute surfaces, comprising:
   providing a structure having at least one involute surface;
   defining the geometry of said structure having said involute surface;
   providing probe means for tracing the topology of said involute surface and providing a first plurality of topography-indicating signals;
   defining a number of said topography-indicating signals to be used as samples in representing said topography of said involute surface;
   defining a starting velocity at which said probe means traces a first location on said involute surface;
   defining a second velocity at which said probe means traces a second location on said involute surface;
   using said geometry of said structure, said starting velocity and said second velocity to determine a rate ($S_p$) at which a distance between successive topography-indicating signals representing said involute surface changes;
   determining a rate ($S_c$) at which said distance between successive topography-indicating signals changes per said sample;
   causing said probe means to traverse said involute surface to thereby generate said first plurality of topography-indicating signals;
   controllably selecting from said first plurality of topography-indicating signals a second plurality of signals, in accordance with said number of topography indicating signals to be used as samples wherein said signals of said second plurality of signals are representative of evenly spaced apart points along said involute surface; and
   using said signals of said second plurality of signals to graphically represent said topography of said involute surface; and
   wherein obtaining said second plurality of topography-indicating signals includes setting a variable (VAL) equal to said rate ($S_p$) at which said distance between successive topography-indicating signals changes along said involute surface;
   setting said rate ($S_p$) at which said distance between said topography-indicating points changes equal to the sum of said rat ($S_p$) at which said distance between said topography-indicating signals changes and said rate ($S_c$) said distance changes per said sample;
   reading an analog-to-digital (A/D) converter to obtain a topography-indicating signal;
   determining if said variable (VAL) currently has a value less than the sum of a previously measured rate ($S_p$) at which said distance between said topography-indicating signals changes and said rate ($S_c$) said distance changes per said sample;
   saving and storing said current VAL when said current VAL is greater than the sum of the previously determined VAL plus 1, and setting VAL equal to said previously determined VAL;
   determining if said number of said topography-indicating signals to be used as samples has been obtained;
   setting said variable (VAL) equal to the sum of a current variable (VAL) plus the current rate ($S_p$) at which said distance between said topography-indicating signals changes; and
   setting said rate ($S_p$) equal to the sum of the current rate ($S_p$) at which said distance between said topography-indicating signals changes and said rate ($S_c$) said distance changes per said sample.

\* \* \* \* \*

UNITED STATES PATENT AND TRADEMARK OFFICE
CERTIFICATE OF CORRECTION

PATENT NO. : 5,136,527
DATED : August 4, 1992
INVENTOR(S) : Koretz

It is certified that error appears in the above-identified patent and that said Letters Patent is hereby corrected as shown below:

Column 7, line 16, Claim 4,
After "variable" insert --(VAL)--.

Column 7, line 44, Claim 4
After "(Sp)" delete "t".

Column 8, line 2, Claim 5
After "said" delete "said".

Column 8, line 34, Claim 6
After "and" delete "proving" and insert --providing--.

Column 10, line 39, Claim 13
after "said" delete "rat" and insert --rate--.

Signed and Sealed this

Twenty-third Day of November, 1993

Attest:

BRUCE LEHMAN

*Attesting Officer*     *Commissioner of Patents and Trademarks*